L. A. LARSON.
THERMOSTAT FOR CONTROLLING FURNACES.
APPLICATION FILED JUNE 29, 1912.
1,069,438.
Patented Aug. 5, 1913.
2 SHEETS—SHEET 2.
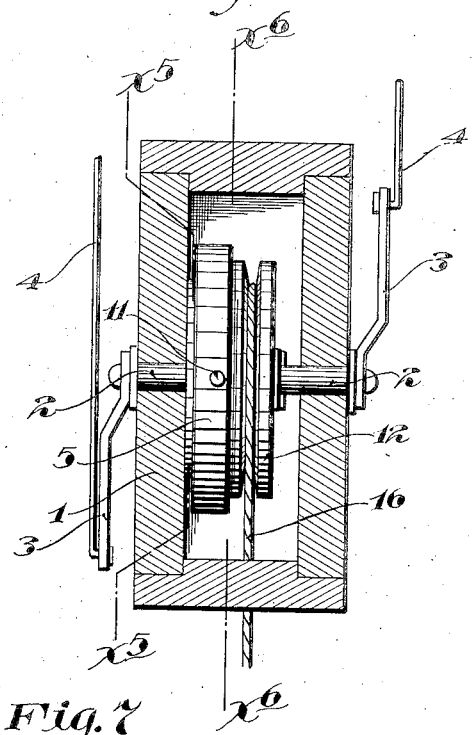
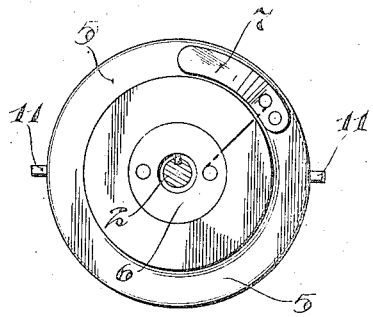
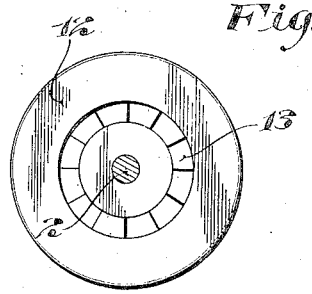
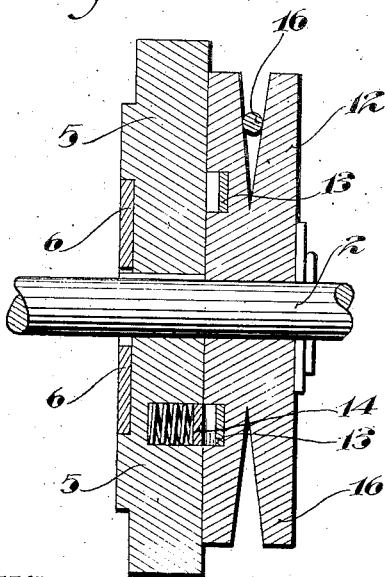
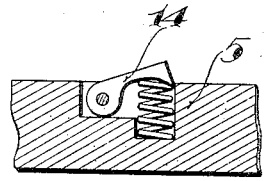
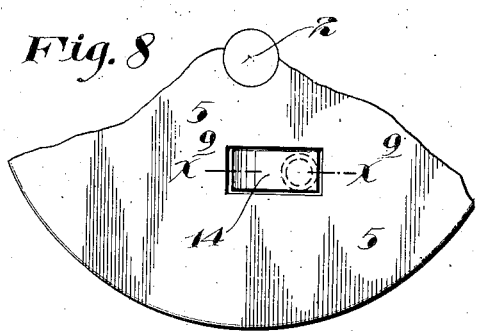
Witnesses:
E. C. Skinkle
Geo. Knutson
Inventor,
Louis Andrew Larson
By his Attorneys,
Williamson Merchant

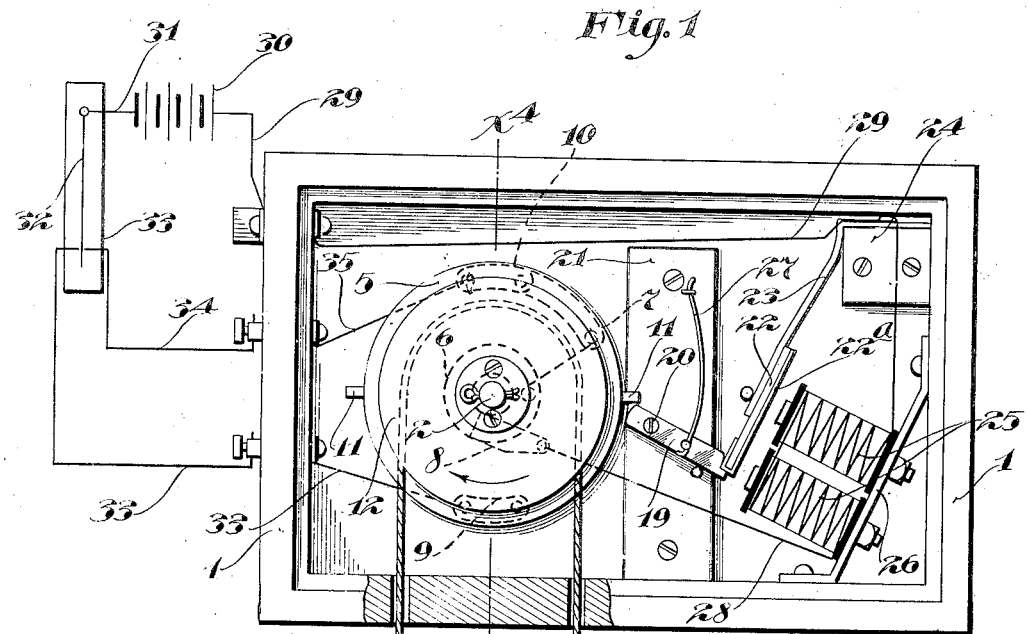

UNITED STATES PATENT OFFICE.

LOUIS ANDREW LARSON, OF MINNEAPOLIS, MINNESOTA.

THERMOSTAT FOR CONTROLLING FURNACES.

1,069,438.  Specification of Letters Patent.  Patented Aug. 5, 1913.

Application filed June 29, 1912. Serial No. 706,831.

*To all whom it may concern:*

Be it known that I, LOUIS ANDREW LARSON, a citizen of the United States, residing at Minneapolis, in the county of Hennepin and State of Minnesota, have invented certain new and useful Improvements in Thermostats for Controlling Furnaces; and I do hereby declare the following to be a full, clear, and exact description of the invention, such as will enable others skilled in the art to which it appertains to make and use the same.

Particularly, my invention has for its object to provide an improved weight motor adapted for use in connection with automatic heat regulators but the improved motor is capable of general use wherever there is desired an intermittently acting movable force.

Generally stated, the invention consists of the novel devices and combinations of devices hereinafter described and defined in the claim.

In the accompanying drawings which illustrate the invention, like characters indicate like parts throughout the several views.

Referring to the drawings, Figure 1 is a view in front elevation with some parts broken away and some parts removed showing the improved motor and illustrating, diagrammatically, a thermostat, and electrical connections between the thermostat and motor; Fig. 2 is a detail view in front elevation with some parts broken away, showing a part of the motor case and the fixed contacts of the thermostat circuit; Fig. 3 is a detail in elevation looking at the motor case from the left toward the right, in respect to Fig. 1; Fig. 4 is a section taken on the line $x^4$ $x^4$ on Fig. 1; Fig. 5 is a detail in section on the line $x^5$ $x^5$ on Fig. 4, some parts being removed. Fig. 6 is a section taken on the line $x^6$ $x^6$ on Fig. 4; some parts being removed; Fig. 7 is a detail view in horizontal section taken centrally through the so-called contact ring and coöperating driving wheel; Fig. 8 is a fragmentary view in elevation, showing the so-called contact ring; and Fig. 9 is a horizontal section on the line $x^9$ $x^9$ on Fig. 8.

Preferably, most of the elements of the motor proper are contained within a suitable case 1, one side of which is removed in Fig. 1.

The numeral 2 indicates a crank shaft which is extended through the case 1, is journaled in the sides thereof, and at its projecting ends is provided with crank arms 3 that project diametrically in opposite directions. These crank arms 3 operate alternately to open and close the draft and check dampers of a furnace, not shown, through suitable connections 4 attached to the respective crank arms 3. The shaft 2 operates as a working shaft, and rigidly secured thereon within the case 1 is a so-called contact wheel 5 that is provided with a concentric contact ring 6 and with an eccentric contact 7. The contact ring 6 is in constant engagement with a fixed contact 8, shown as secured to one side of the case 1; and the contact 7 is adapted to alternately engage with fixed contacts 9 and 10, also shown as secured to the same side of the case 1. These contacts 9—10 are located diametrically opposite to each other in respect to the axis of the shaft 2. The so-called contact wheel 5 is provided at diametrically opposite points with projecting stop lugs 11, the purpose of which will presently appear.

Loosely journaled on the shaft 2 adjacent to the so-called wheel 5 is a peripheral grooved driving wheel 12, which, on that face which is adjacent to the said contact wheel 5, is provided with a faced toothed ratchet ring 13. For engagement with the ratchet ring 13 the contact wheel 5 is provided with a spring pressed lug 14 that constantly engages the teeth of said ratchet ring and coöperates therewith, to cause the driving wheel 12, when rotating in the direction of the arrow marked thereon in Fig. 1, to positively rotate the said contact ring in the same direction.

The motive force for driving the wheel 12 is preferably afforded by a quite heavy weight 15, connected to one end of a driving cable 16, advisably through a coiled spring 17. This driving cable 16 is passed over the driving wheel 12 and works with very considerable frictional engagement therewith, in the diverging peripheral groove thereof. At its opposite end, the said cable is shown as provided with an end ring 18, by means of which that end of the cable may be drawn downward and the weight 15 raised whenever desired. It will, of course, be understood that when the cable is thus drawn to raise the weight the driving wheel 12 will be permitted a backward rotation while the contact wheel 5 remains stationary, due to slippage of the dog 14 over the teeth of the coöperating ratchet ring 13. Normally, one or the other of the stop lugs 11 of the contact wheel 5 engages with an escapement acting stop device, preferably in the form of a small lever 19 pivoted at 20 to a supporting bar 21 secured within the case. The outer end of the escapement lever 19 is normally under strain to move upward, due to the force of the weight 15 acting thereon through the engaging contact lug 11. This movement, however, is normally prevented by an armature 22 secured to the free end of a spring arm 23 that is anchored to a suitable bearing 24 secured within the case 1. The spring tension in the arm 23 tends to hold the said armature 22 in its retracted normal position, shown in Fig. 1. The armature 22 is preferably provided with a thin brass or copper facing 22ª that engages with the outer end of the escapement lever 19 and prevents sticking of the armature to the said lever under magnetic action. An electro-magnet 25, secured to a suitable support 26 within the case 1 coöperates with the armature 22, and when energized, moves the same far enough to release the outer end of the escapement lever 19. The said escapement lever 19, however, is subject to a suitable spring 27 attached to and anchored to the supporting bar 21. This spring 27, while it normally tends to hold the said lever 19 in its operative position shown in Fig. 1, is of such a weak tension that when the force of the weight 15 is on the inner end thereof, and the outer end thereof is released from the armature 22, the said lever will be rocked into a position to permit the engaging lug 11 of the contact wheel 5 to be carried past the same. This action will be further considered in the description of the operation. One terminal of the coil of the magnet 25 is connected by a wire 28 to the fixed contact 8, and the other terminal of said coil is connected to one lead 29 of a battery or other source of electrical energy 30. The other lead 31 of the battery 30 is connected to the movable thermally actuated contact 32 of a thermostat 33 of ordinary well known construction. The other two contacts, to-wit, the outer contacts of the thermostat, are connected by leads or wires 33 and 34, respectively, to the fixed contacts 9 and 10. In the battery lead 29 (see Fig. 3), a normally closed switch 35 is preferably interposed. When this switch 35 is in open position, the thermostat is thrown out of action, but when it is closed, the thermostat is rendered operative to control the intermittent actions of the motor.

Operation: The principle upon which the thermostat controls a weight motor is well understood to all familiar with the subject. When the contact wheel 5 is stopped by engagement with one or the other of the stop lugs 11 thereof, with the escapement lever 19, its contact 7 will be in engagement with one or the other of the diametrically opposite fixed contacts 9—10; and at such time, the battery circuit will be closed through the magnet 25 by movement of the thermostat contact 32 in proper direction. When the circuit is thus closed through the magnet, the magnet will be energized and will draw the armature 25 out of engagement with the outer end of the escapement lever 19 and then the force of the weight 15, acting on the short inner end of said lever, through the engaging stop lug 11, will cause the latter to force the free end of the said lever upward and the inner end thereof downward, thereby permitting the said lug to move past the said escapement lever. Immediately after the said lug is passed, the said escapement lever and spring 27 will throw the said lever back to its normal position, and at or about the same time, the contact 7 will move out of engagement with the fixed contact 9 or 10, as the case may be, thereby breaking the battery circuit through the magnet with the result that the said magnet will be deënergized and the armature 22 will be thrown back into its normal position and thereby again lock the escapement lever 19 in its operative position. Under this action, a quick return of the escapement lever to its normal or operative position is insured so that it will be sure to intercept the other stop lug 11. In this way, at each release of the contact wheel 5, the latter will be given a half rotation under the action of the wheel 12. To raise the weight, it is only necessary, as already stated, to pull downward on the ring 18. The spring 17 relieves the mechanism of the motor from jars or undue strains when one of the stop lugs 11 engages with the escapement lever 19.

The term "cable" is herein used in a broad sense to include any kind of a flexible connection for applying a driving force to the driving wheel or corresponding rotary member.

What I claim is:

In a motor of the kind described, the combination with a working shaft and support therefor, of a driving wheel loose on said shaft, a contact wheel secured to said shaft adjacent to said driving shaft, a pawl and ratchet connection between said driving wheel and contact wheel applied to the adjacent faces thereof, a contact ring and traveling contact applied to the other face of said contact wheel, a fixed contact having continuous engagement with said contact ring, diametrically opposite fixed contacts with which the traveling contact of said contact wheel engages alternately, a thermostat having three leads connected to the said three fixed contacts, means tending to rotate said driving wheel, circumferentially spaced stops on said contact wheel, an escapement lever yieldingly held in an operative position for engagement in succession with the stops on said contact wheel, an electro-magnet, a device normally locking said escapement lever in its operative position and including an armature that is subject to said electro-magnet, and electrical connections to said electro-magnets including all of the above noted electrical contacts, substantially as described.

In testimony whereof I affix my signature in presence of two witnesses.

LOUIS ANDREW LARSON.

Witnesses:
 BERNICE G. WHEELER,
 HARRY D. KILGORE.